W. & G. H. SELLERS.
Rolling-Mills.
No. 145,129.
4 Sheets--Sheet 1.
Patented Dec. 2, 1873.
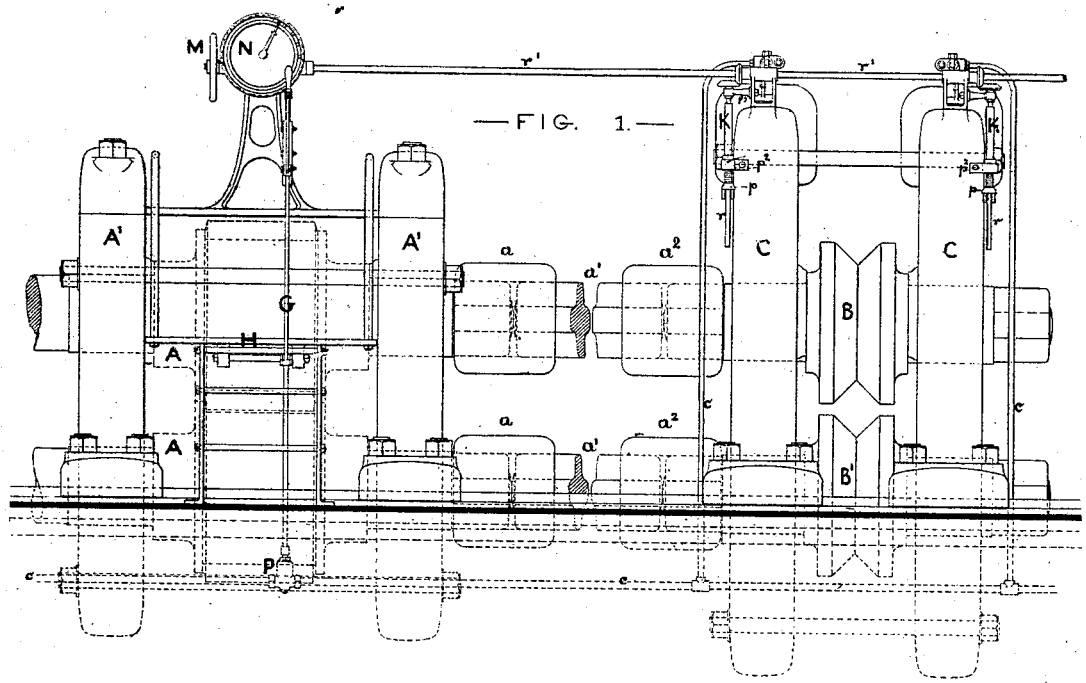
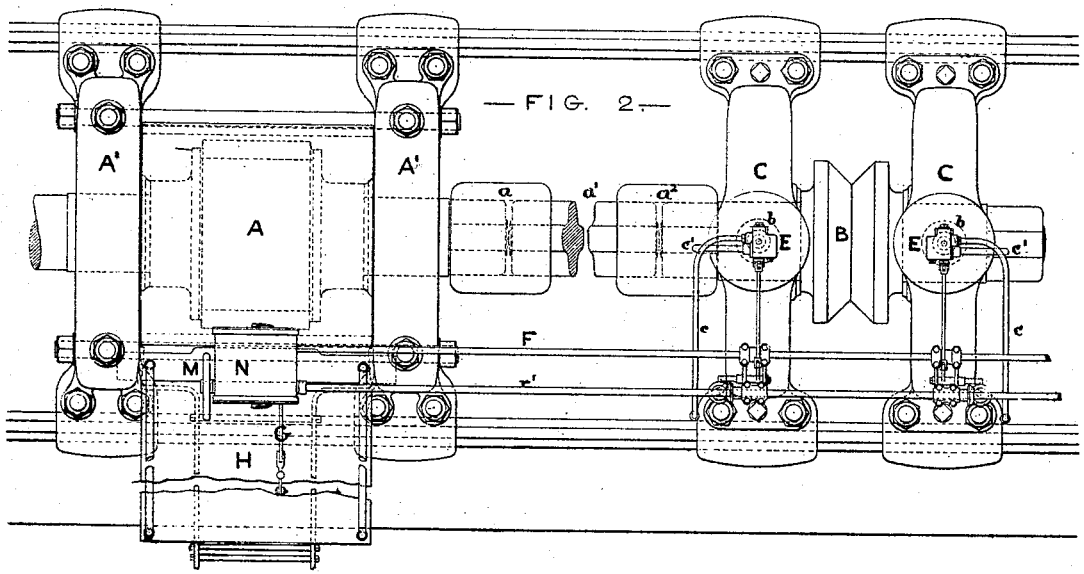
WITNESSES:
Jos. C. Fraley
Wm. C. Morgan
INVENTORS
Wm Sellers
Geo. H. Sellers
per Henry Baldwin Jr.
Atty.

W. & G. H. SELLERS.
Rolling-Mills.
No. 145,129.  Patented Dec. 2, 1873.
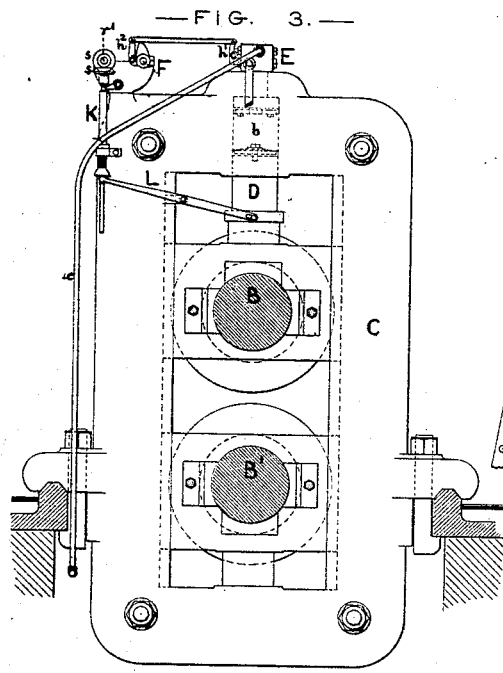
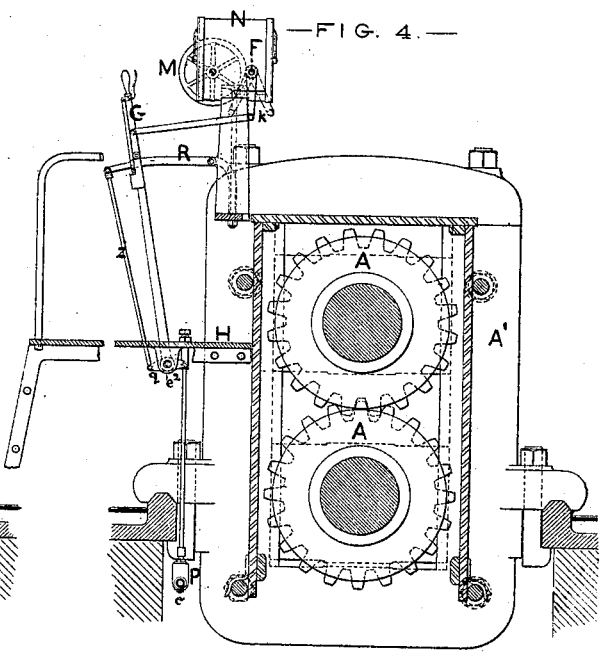
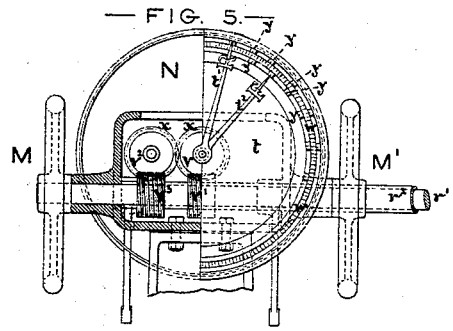
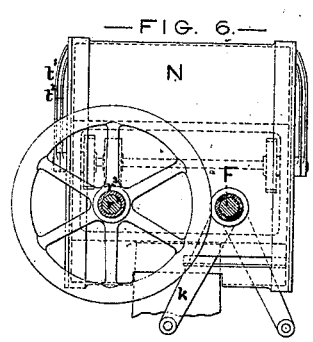
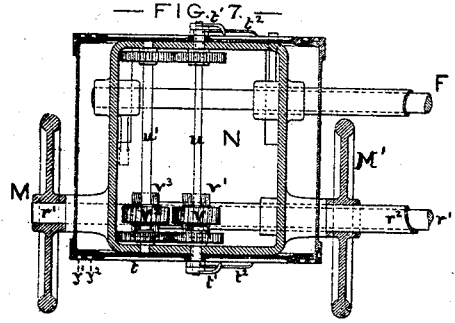
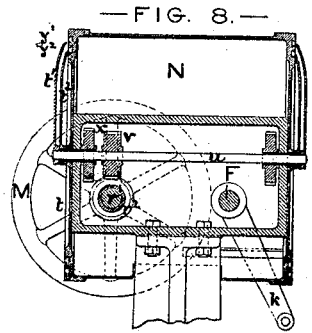
WITNESSES:
Jos. C. Fraley,
Wm. E. Morgan.
INVENTORS
Wm. Sellers.
Geo. H. Sellers
per Henry Baldwin Jr.
atty.

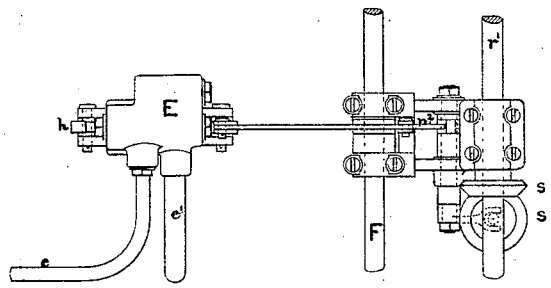
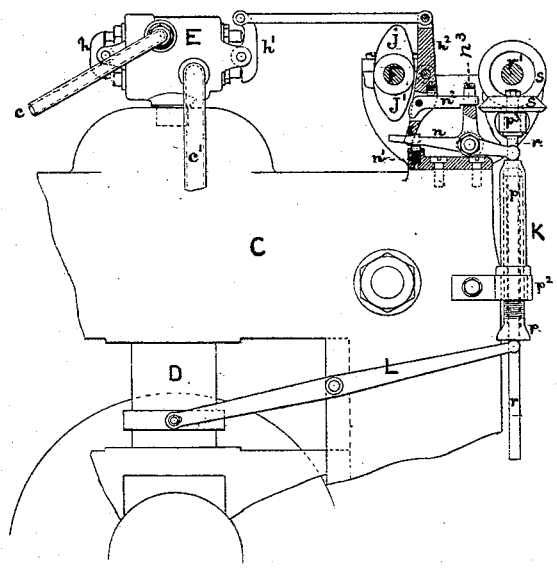
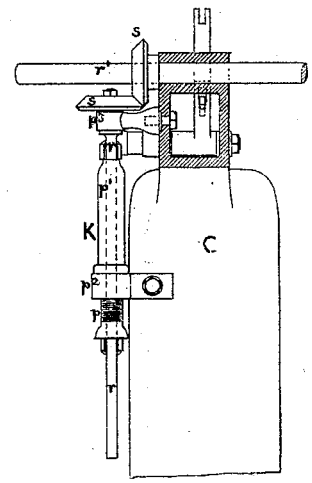
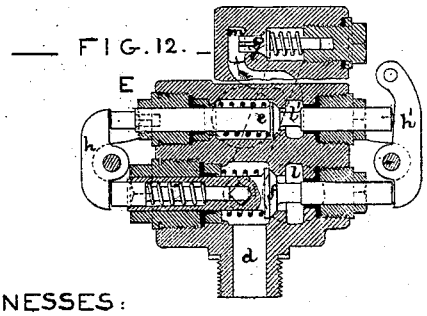
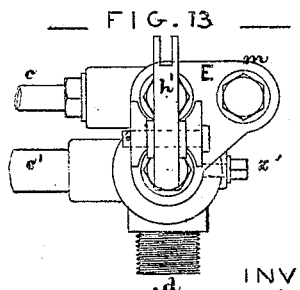

W. & G. H. SELLERS.
Rolling-Mills.
No. 145,129.
4 Sheets--Sheet 4.
Patented Dec. 2, 1873.
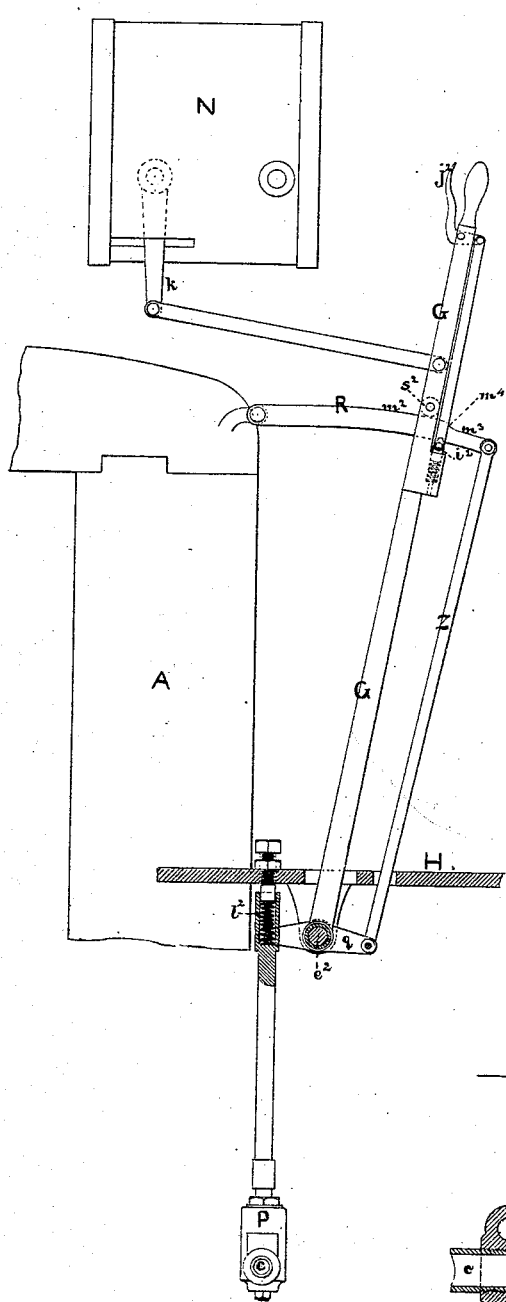
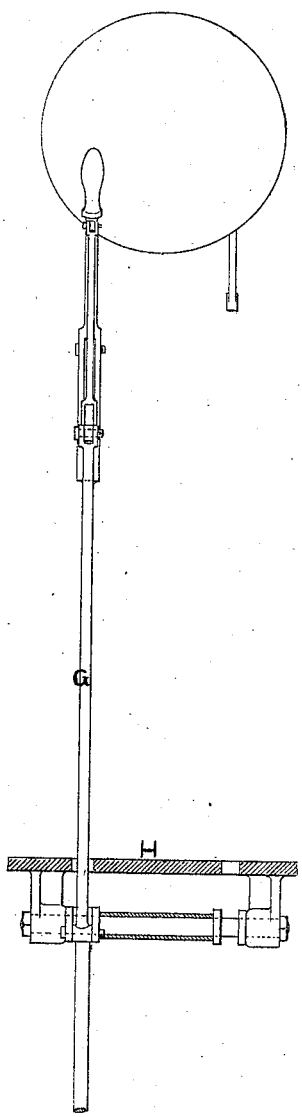
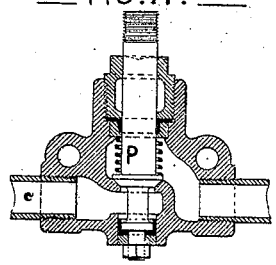
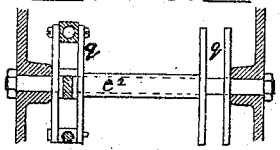
WITNESSES:
Jos. C. Fraley.
Wm. E. Morgan.
INVENTORS
Wm Sellers
Geo. H. Sellers.
per Henry Baldwin
Atty.

UNITED STATES PATENT OFFICE.

WILLIAM SELLERS, OF PHILADELPHIA, PENNSYLVANIA, AND GEORGE H. SELLERS, OF WILMINGTON, DELAWARE.

IMPROVEMENT IN ROLLING-MILLS.

Specification forming part of Letters Patent No. 145,129, dated December 2, 1873; application filed May 28, 1873.

*To all whom it may concern:*

Be it known that we, WILLIAM SELLERS, of the city and county of Philadelphia, in the State of Pennsylvania, and GEORGE H. SELLERS, of Wilmington, in the county of New Castle and State of Delaware, have jointly made an invention of certain new and useful Improvements in Rolling-Mills; and that the following is a full, clear, and exact description and specification of the same.

This invention has reference to mills for rolling metals and for other purposes; and its object is to enable the rolls to be set at different distances apart with rapidity, and to be held rigidly in the positions in which they are set. We obtain these results by means of hydraulic pressure applied to one or more of the rolls of a set by means of hydraulic cylinders and the rams thereof, the supply and discharge of the water being regulated by suitable valves, in such a manner that when a sufficient quantity of fluid has been admitted for adjusting the ram in any cylinder the supply shall be cut off and the fluid shall be retained within the cylinder, to maintain the ram in its adjusted position against any pressure that the rolls can transmit.

The invention consists of certain combinations of mechanism, of which the following are the principal elements, viz: First, the roll which is employed to act upon the material, and which may have either a plain cylindrical barrel or one grooved or fluted or otherwise formed to adapt it to the work to be performed. Second, the housings or frame which sustains the roll in its positions and permits it to be moved. Third, one or more hydraulic cylinders for containing the water or other fluid by the pressure of which the movement of the roll is effected. If two hydraulic cylinders for each movable roll are employed, as will generally be expedient, they may be formed directly in the frame or housings; or, if preferred, they may be constructed separately from the frame or housings and secured thereto. Fourth, one or more rams or pistons for the hydraulic cylinder or cylinders. We prefer to construct the apparatus so that the hydraulic cylinders are fixed and the rams are caused to move relatively thereto; but, if deemed expedient, the pistons may be fixed, and the cylinders be constructed to move relatively to them. In the latter case the passages for the ingress and egress of the fluid should be made in the pistons. Fifth, self-closing mechanism for closing the inlet-valve of the hydraulic cylinder when the roll has been moved the required predetermined distance. The construction and arrangement of this mechanism may be greatly varied by the employment of mechanical equivalents or substitutes, the peculiarity of the mechanism being that it forms a connection between the movable roll (or some instrument moving simultaneously therewith) and the inlet-valve of the hydraulic cylinder, so that the said valve is either closed or permitted to be closed by a spring or other agent when the roll has moved the predetermined distance. Sixth, adjusting mechanism for adjusting the self-closing valve mechanism, so that the position at which the movement of the roll is stopped may be varied by varying the adjustment of this adjustable mechanism. The form and construction of this mechanism may be greatly varied, as stated, in reference to the preceding mechanism. Seventh, an indicator for indicating the position of the movable roll, or of the ram, such indicator consisting of an index and means of indicating the extent of movement. The indicator we prefer to use is an index-hand moving circularly upon a dial; but the hand may be stationary, and the dial may be moved, or some substitute may be used for each. Eighth, a valve for controlling the admission of fluid to the valve-chest of the hydraulic cylinder. Ninth, a stop-latch for limiting the movement of the roll in case the inlet-valve of the hydraulic cylinder should not be entirely closed by the mechanism for that purpose.

In order that the invention may be fully understood, we have represented in the accompanying drawings, and will proceed to describe, a rolling-mill embodying it in the best form at present known to us, reserving to ourselves the right to modify the mechanism, as circumstances may require.

In said drawings, Figure 1 represents a front elevation of a rolling-mill with our invention applied to it. Fig. 2 represents a plan of the same. Fig. 3 represents an end view of the same. Fig. 4 represents a transverse section of the rolling-mill at the inner side of one of the pinion-housings. Figs. 5 to 17, inclusive, represent views of various parts of the mechanism detached from the residue.

The same parts are denoted by the same letters in the various figures.

The rolling-mill represented in the drawings is an illustration of one mode of embodying our invention. It has a set of pinions, A A, and pinion-housings A′ A′, and a set of rolls, B B′, and roll-housings C C; and it is intended to operate in connection with a second set of rolls and roll-housings for finishing, arranged at the right-hand side of the rolls represented in Figs. 1 and 2, the rolls of such second set being connected with the driving ends of the set B B′ by means of coupling-spindles and boxes similar to those $a$ $a^1$ $a^2$, which connect the rolls B B′ with the pinions A A. In the rolling-mill thus represented the lower roll, B′, is stationary, while the upper roll, B, is arranged to move toward and from the lower roll. For this purpose the journals of the upper roll are arranged to revolve in brasses supported by movable boxes, (one for each journal;) and these boxes are constructed to slide in the housings, and are connected with a counterpoise-weight, in the usual manner, by means of rods and levers, which, being of the usual construction, are not represented in the drawings. The counterpoise-weights which are used should be heavy enough to raise the upper roll and its appurtenances, and to displace the fluid in the cylinders whenever such upward movement is permitted. The hydraulic pressure, by which the movable roll is forced toward the stationary roll, is applied to two hydraulic cylinders, $b$, Fig. 3, one of which is formed in the head of each of the roll-housings C. Each hydraulic cylinder is fitted with a ram or piston, D, which is suitably packed. The water is supplied to the cylinder by means of pipes $c\ c$, which communicate with an accumulator of the usual construction; and, in the present case, the plunger or piston of the accumulator is loaded with a weight of four hundred pounds to the square inch. The supply of water to each cylinder $b$ and its escape therefrom are determined by means of valves contained in a valve-chest, E, one of which is arranged above each cylinder; and these valve-chests and their valves are represented in detail at Figs. 9, 10, 11, 12, and 13. Each valve-chest E is connected with the cylinder beneath by means of a passage, $d$, and each contains an inlet-valve, $e$, an escape-valve, $f$, and a check-valve, $g$, and each valve is fitted with a spring, which tends to move it toward its valve-seat, and thus insures its closing. The valve-stems of the inlet and escape valves are connected by means of a lever, $h$, and a spring-piston, $i$, which is compressed whenever the valve is opened, to insure the closing of the valve when released from the opening mechanism. The inlet and escape valves are operated by means of a valve-lever, $h^1$, which is connected with a second valve-lever, $h^2$, and the latter valve-lever is commanded by a rock-shaft, F. This rock-shaft extends across the housings of the set or pair of rolls, and it is fitted opposite each lever $h^2$ with two toes, J J′, so that by rocking the rock-shaft in one direction the inlet-valve is opened, and by rocking it in the other direction the escape-valve is opened, while by leaving the rock-shaft and toes in a negative position, as represented at Fig. 10, both valves remain closed. For convenience of operation, the rock-shaft F is extended to the pinion-housings, where it is fitted with an arm, $k$, that is connected with a hand-lever, G, by moving which the rock-shaft can be moved in either direction, and either valve may be opened. A raised platform, H, is also provided for the operator. When the escape-valve is opened, the water from the cylinder escapes into the passage $l$, Fig. 12, and thence passes out of the valve-chest by the pipe $c'$. The fluid from the accumulator enters the valve-chest by means of the pipe $c$, and passes into the valve-chamber of the inlet-valve $e$, Fig. 12, which is arranged to open against the pressure of the accumulator, so as to prevent the passage of fluid through it when there is no resistance to the movement of the roller by the hydraulic pressure. When the inlet-valve is opened the water can pass through the valve-seat into the passage $l^1$, and thence, in an oblique lateral direction, to the chamber $m$ of the check-valve $g$, which will move from its seat whenever the pressure of the water supplied from the accumulator is greater than the pressure in the water-cylinder. The water passing through the valve-seat of the check-valve $g$ enters a descending passage, (represented by dotted lines in Fig. 12,) which communicates with the main passage $d$ to the hydraulic cylinder beneath. The object of the check-valve $g$ is to prevent the return of water from the hydraulic cylinder to the accumulator when the pressure in the former exceeds that in the latter, as is usually the case when iron is passing between the rollers; and, for this purpose, it is arranged to close by moving against the current of water passing from the inlet-valve toward the hydraulic cylinder, so that when the check-valve is closed the movable roll is fixed in its position by the water within the hydraulic cylinder. The mechanism thus far described enables the movable roll B to be moved toward the stationary roll by hydraulic pressure, and permits the former to be moved from the latter by the counter-weights, but does not determine the extent of the movement. In order that such extent may be controlled as required, so that the movable roll may be moved a definite distance by the hydraulic pressure, self-closing mechanism is provided to close the inlet-valves of the hydraulic cylinders of the movable roll as soon as the movable roll has been moved to any previously-indicated position. To this end the valve-lever $h^2$, Fig. 10, is slotted, so as to permit the end of the latch $n$ to pass through it, and a spring, $n^1$, is provided to cause the hook of the latch to engage with and hold the valve-lever whenever the latter is moved to open the inlet-valve. The latch has the form of a lever, and its outer end is arranged within the range of movement of the head of the slide K. This slide is constructed in two parts, $p$ $p^1$, the former, $p$, of which has the form of a screw, and the latter, $p^1$, of an elongated nut or sleeve, which is screwed upon the said screw. The slide is held upright by means of two brackets, $p^2$ $p^3$, one of which holds the lower end of the sleeve $p^1$, while the other bracket, $p^3$, holds the upper end of a shaft, $r$, which traverses the slide. The brackets hold the slide loosely, so that it may be readily moved up and down. The lower end of the slide is commanded by a lever, L, whose inner end is connected with the ram D of the hydraulic cylinder, and whose outer end is beneath the slide. Hence, when the ram D moves downward to move the roll, the outer end of the lever L, acting upon the lower end of the slide K, raises the slide. The slide, when raised, moves the latch $n$ and releases the valve-lever $h^2$, thus permitting the inlet-valve to close and stop the entrance of water from the accumulator, the result of which operation is that the movement of the roll is stopped at the place where it happens to be when the lever L operates the slide K. In order that the movement may be stopped for different positions of the movable roll, the slide K is shortened or elongated by screwing its screw part $p$ more or less into the sleeve part $p^1$. For this purpose the shaft $r$, which traverses the slide, is connected with it by means of a longitudinal groove and spline, so that it may turn the screw part $p$, and the sleeve part $p^1$ is prevented from turning by means of a similar groove and spline, which groove is formed in the bore of the bracket $p^2$. Hence the turning of the shaft $r$ adjusts the slide, and the two slides for one movable roll are adjusted simultaneously by connecting their shafts $r$ $r$ with a long adjusting-shaft, $r^1$, which is fitted with a hand-wheel for the operator. The connection of the shafts $r$ $r$ $r^1$ is effected by the beveled wheels $s$ $s$. When the train contains but one pair of rolls, but one adjusting-shaft is required, as shown in Figs. 1 and 2; but when the train contains two pairs of rolls which require movement, two adjusting-shafts (one for each pair) are required, and in the latter case it is convenient to have one of these shafts a tubular shaft, as at $r^2$, Figs. 5, 6, 7, and 8, and to arrange it to turn upon the other shaft $r^1$. If more than two adjusting-shafts are required, one or more additional tubular shafts may be added.

In order that the operator who controls the mechanism may readily adjust the adjustable slides K for the successively different positions which the movable roll is required to occupy during the rolling of a bar by successive passages between the rolls, an indicator, N, is provided, and is arranged in this instance over the pinion-housings. The indicator, suitable to be used with two sets of rolls in a train, is represented in detail at Figs. 5, 6, 7, and 8. It has dials $t$ $t$ and hands $t^1$ $t^1$ $t^2$ $t^2$—two for the set of roughing-rolls, the others for the finishing-rolls. The hands $t^1$ $t^1$ are secured to the ends of a shaft, $u$, which is connected, by a worm-wheel, $v$, and screw $v^1$, with the adjusting-shaft $r^2$ of the finishing-rolls, so that, when the adjusting-shaft $r^2$ is turned by its hand-wheel M', the hands $t^1$ $t^1$ shall traverse the dials $t$ $t$. For convenience in setting the roll, the dials are graduated with rings of divisions, $w$, which correspond with some fractional part of the movement of the adjustable part $p$ of the piston K. The other hands $t^2$ $t^2$ are fitted to short tubular shafts or sleeves, which turn upon the respective ends of the shaft $u$ of the first hands $t^1$ $t^1$, and are connected, through the cog-wheels $x$ $x$, the counter-shaft $w'$, and the worm-wheel and screw $v^2$ $v^3$, with the second adjusting-shaft $r^1$, so that the second hands $t^2$ $t^2$ are caused to turn correspondingly with the turning of the second adjusting-shaft $r^1$ by the hand-wheel M. By watching the proper hand, the operator thus has it in his power to adjust the slides of the movable roll so as to stop their movement by the hydraulic mechanism at any desired point. In order to facilitate the adjustment of the hydraulic mechanism, the dials have annular grooves $y^1$ and $y^2$ for each hand $t^1$ $t^2$, and movable markers, $y$ $y$, are fitted to these movable rings or grooves, so that these markers may be set beforehand at the places at which the hands are to be successively stopped during the operation of rolling a bar. Each marker is, by preference, constructed with a friction-spring, to hold it by friction in the place at which it may be set. The dials, hands, and markers are duplicated, as shown and described, merely for convenience. If the valve-lever $h^2$, Fig. 10, were entirely under the control of the operator, he might not move it sufficiently to latch it by the latch $n$, but might hold it open by the rock-shaft F sufficiently to let the water move the movable roll much farther than was required. In order to prevent such a contingency, an admission-valve, P, is inserted in the pipe $c$ between the accumulator and the valve-chests E E; the most convenient position for this valve being in the vicinity of the platform H, upon which the operator stands. In the present case this valve, as represented at Fig. 17, is a balanced valve, so that it may be readily moved against the high pressure in the accumulator. This valve and the inlet-valves $e$ are so combined that the valve P cannot be opened until the rock-shaft F has been moved sufficiently to engage the valve-lever $h^2$ with the latch $n$, and has been rocked back again toward the central position sufficiently to free the valve-lever $h^2$ from any control by the opening-toe J'.

The combination, in the present instance, is effected in the following manner: The stem of the valve P is connected, by a lever, $q$, Fig. 14, and rod $z$, with a segment, R, which is pivoted at one end to the housing A', and extends transversely through a slot in the hand-lever G, by which the inlet-valve is opened. An anti-friction wheel, $s^2$, is secured in the slot of the hand-lever, in the proper position to act upon the upper edge of this segment, which has two grades, $m^2$ $m^3$, both of which are concentric with the pivot $c^2$ of the hand-lever G, and which are connected by an inclined grade, $m^4$. The adjustment of the mechanism is such that when the hand-lever G and the rock-shaft F are in their mean positions, as seen in Figs. 14, 4, and 10, the valve P is open, and the anti-friction wheel $s^2$ bears upon the larger concentric portion $m^2$ of the segment R; but when the hand-lever is moved outward for the purpose of opening the inlet-valve, the depression of the grade $m^4$ permits the segment R to rise, and the valve P to be closed by means of a spring, $l^2$, provided for that purpose; and the valve is held closed by its spring until the hand-lever is moved inward, and its anti-friction wheel depresses the segment R. Hence, whenever the operator moves the lever G for the purpose of opening the inlet-valve, he, by that act, permits the valve P to close and prevent water from passing to the valve-chests, and thence to the hydraulic cylinder, until he has first set the inlet-valve, and has then moved the rocking toe backward to its central position, so as to leave the inlet-valve free to be closed by its spring whenever the slide K trips the latch $n$. On the other hand, if the operator moves the hand-lever G back to its mean position without having moved it outward far enough to cause the valve-lever $h^2$ to be latched by the latch $n$, the valve-lever will move back, by the action of the valve-spring, with the backward movement of the hand-lever, and the inlet-valve will be closed by its spring by the time the admission-valve is opened. The operator is thus compelled to move the hand-lever in both directions the requisite distance for the proper operation of the inlet and admission valves, or no water passes to the hydraulic cylinder, and the movable roll will not be moved.

For convenience of holding the hand-lever in its mean position, a spring-latch, $i^2$, Fig. 14, is provided to engage with a notch in the under side of the segment-lever R; and this latch is manipulated by the handle $j^2$, so that the operator can free the hand-lever G by the same hand that moves the latter. The closing movement of the roll being arrested by the closing of the inlet-valve $e$, and the water-pressure always remaining upon this valve, except when the latching mechanism is being adjusted, it is evident that, if from any cause the valve $e$ should not be perfectly tight, the closing movement of the roll would continue with more or less rapidity, depending upon the quantity of water passing the valve $e$. To guard against accident from such an occurrence, we provide a stop-latch, $n^2$, Figs. 9 and 10. This stop-latch is pivoted to the valve-lever $h^2$, and passes through a slot in a projection, $n^3$, of the latch $n$. A notch on the under side of this stop-latch $n^2$ falls in front of $n^3$, as shown in Fig. 10. In this position, should the closing movement of the roll continue, the projection $n^3$ would press against the notch in the latch $n$, and, through this latch, communicate its movement to the lever $h^2$, thereby opening the exhaust-valve, and permitting the water to escape as fast as it enters the pressure-cylinder, and effectually arresting any further movement of the roll. The stop-latch $n^2$ has a toe, which projects toward the rocking toe J', in advance of the face of the valve-lever $h^2$, so that the first operation of the rocking toe J', when rocked toward the valve-lever $h^2$ for the purpose of latching this lever on $n$, is to trip the stop-latch $n^2$, and permit the valve-lever $h^2$ to move without being arrested by the projection $n^3$. After the successive closings of the rolls required to complete the successive passes of the rolling operation, the indicator is turned backward until the index-hand is at the place of beginning. This will restore the slide K to its original position, ready for another series of passes.

The position of the rolls is restored for a fresh operation by rocking the toe J against the valve-lever $h^2$, causing the exhaust-valve to open, and permitting the escape of the water from the pressure-cylinders. The counter-weights will then force the rolls back to the required position.

In the case of what is technically known as a "cobble," where the rolls become jammed, the pressure upon the valves may possibly be so great (not being entirely balanced) as to prevent their movement. To relieve this condition, we provide a screw-plug, $z'$, which can always be opened, so as to permit the escape of water from the pressure-cylinders, and allow the rolls to open to their original position, and in this particular the system described presents very great advantages over the ordinary screw adjustments. The adjustment for each pass can readily be made while the material being operated upon is passing through the rolls, so that ample time is afforded for this purpose. The rolls instantly set themselves to this adjustment after each pass, the attendant moving the lever G out and relatching, and such adjustment has not heretofore been attained.

In the drawings above referred to, the improvements are represented as applied to sets of rolls having one movable roll in each set; but the improvements are equally applicable to sets having two movable rolls in each set. In the latter case a set of hydraulic cylinders and their appurtenances may be applied to the lowermost roll for the purpose of moving it upward, and, as the weight of the roll will insure its movement downward when the hydraulic pressure is relaxed, counterpoise-weights for that roll will be unnecessary.

These improvements are particularly applicable where a number of rolls are to be adjusted simultaneously, as in what is known as the four-roller mill, where the axes of one set of rolls are horizontal and those of a co-operating set are perpendicular.

We are aware that fluid-pressure has been employed for moving to and sustaining the rolls of rolling-mills in position; but in all such cases the position of the roll has been adjusted and maintained either by regulating the escape of the fluid, so that this fluid is at the same time flowing into and out of the roll-pressure cylinders, or the fluid is confined within two cylinders, always in communication with each other, and with a ram in each cylinder, the adjustment and maintenance of the roll-ram being accomplished by the adjustment and maintenance of the ram in the other cylinder, whereas in the present arrangement the fluid, after the adjustment has been made, is entirely cut off from its source of supply, and the maintenance is accomplished by preventing the escape of this fluid from its cylinder under any pressure that the rolls can transmit.

We have represented the movable roll as combined with two hydraulic cylinders and their rams, this being the arrangement we prefer; but one hydraulic cylinder and ram may be used, and the roll may be so combined with these that it may be moved by them.

What we claim as our invention is—

1. The combination, substantially as before set forth, of the hydraulic cylinder, the ram thereof, and the self-closing mechanism for the inlet-valve of the said hydraulic cylinder.

2. The combination, substantially as before set forth, of the movable roll, the hydraulic cylinder, the ram thereof, and the closing mechanism for the inlet-valve of the said hydraulic cylinder.

3. The combination, substantially as before set forth, of the hydraulic cylinder, the ram thereof, the self-closing mechanism for the inlet-valve, and the adjusting mechanism for adjusting the said valve mechanism.

4. The combination, substantially as before set forth, of the movable roll, the hydraulic cylinder, the ram thereof, the self-closing mechanism for the inlet-valve, and the adjusting mechanism for adjusting the said valve mechanism.

5. The combination, substantially as before set forth, of the hydraulic cylinder, the ram thereof, and the indicating mechanism.

6. The combination, substantially as before set forth, of the movable roll, the hydraulic cylinder, the ram thereof, and the indicating mechanism.

7. The combination, substantially as before set forth, of the hydraulic cylinder, the ram thereof, the inlet-valve for said cylinder, and the admission-valve, which is closed while the inlet-valve is being opened.

8. The combination, substantially as before set forth, of the movable roll, the hydraulic cylinder, the ram thereof, the inlet-valve for said cylinder, and the admission-valve, which is closed while the inlet-valve is being opened.

9. The combination, substantially as before set forth, of the hydraulic cylinder, the ram thereof, the inlet-valve, the latch for holding the same open, and the slide for moving said latch.

10. The combination, substantially as before set forth, of the hydraulic cylinder, the ram thereof, the inlet-valve, and the check-valve for preventing the return of water from the hydraulic cylinder.

11. The combination, substantially as before set forth, of the admission-valve, the hand-lever, and the graded segment.

12. The combination, substantially as before set forth, of the inlet-valve, the mechanism for operating it, and the stop-latch for operating the exhaust-valve in connection with the inlet-valve.

WM. SELLERS.
GEO. H. SELLERS.

Witnesses:
JOHN I. BROWN,
ALTER MEGEAR.